(12) United States Patent
Patrick

(10) Patent No.: US 7,748,027 B2
(45) Date of Patent: Jun. 29, 2010

(54) SYSTEM AND METHOD FOR DYNAMIC DATA REDACTION

(75) Inventor: Paul B. Patrick, Manchester, NH (US)

(73) Assignee: Bea Systems, Inc., Redwood City, CA (US)

(*) Notice: Subject to any disclaimer, the term of this patent is extended or adjusted under 35 U.S.C. 154(b) by 1168 days.

(21) Appl. No.: 11/222,071

(22) Filed: Sep. 8, 2005

(65) Prior Publication Data

US 2006/0259954 A1 Nov. 16, 2006

Related U.S. Application Data

(60) Provisional application No. 60/679,823, filed on May 11, 2005.

(51) Int. Cl.
*H04L 9/32* (2006.01)
*G06F 7/04* (2006.01)
*H04L 9/00* (2006.01)

(52) U.S. Cl. .................. 726/2; 726/3; 726/4; 726/5; 726/6; 726/7; 713/161; 713/162; 713/163; 709/224; 709/225; 709/226; 709/227

(58) Field of Classification Search .................. 726/2
See application file for complete search history.

(56) References Cited

U.S. PATENT DOCUMENTS

| | | | |
|---|---|---|---|
| 5,335,345 A | 8/1994 | Frieder et al. | |
| 5,481,700 A | 1/1996 | Thuraisingham | |
| 5,797,128 A | 8/1998 | Birnbaum | |
| 5,826,268 A | 10/1998 | Schaefer et al. | |
| 5,872,928 A | 2/1999 | Lewis et al. | |
| 5,941,947 A | 8/1999 | Brown et al. | |
| 6,005,571 A | 12/1999 | Pachauri | |
| 6,052,531 A | 4/2000 | Waldin et al. | |
| 6,158,010 A | 12/2000 | Moriconi et al. | |
| 6,178,505 B1 | 1/2001 | Schneider et al. | |
| 6,243,747 B1 | 6/2001 | Lewis et al. | |
| 6,256,741 B1 | 7/2001 | Stubblebine | |
| 6,292,900 B1 | 9/2001 | Ngo et al. | |
| 6,321,336 B1 | 11/2001 | Applegate et al. | |
| 6,335,972 B1 | 1/2002 | Chandersekaran et al. | |
| 6,336,114 B1 | 1/2002 | Garrison | |
| 6,412,070 B1 | 6/2002 | Van Dyke et al. | |

(Continued)

OTHER PUBLICATIONS

Ryutov, et al., "Dynamic Authorization and Intrusion Response in Distributed Systems", Proceedings of the DARPA Information Survivability Conference and Exposition, Apr. 2003, 12 pages.

(Continued)

*Primary Examiner*—Longbit Chai
(74) *Attorney, Agent, or Firm*—Fliesler Meyer LLP

(57) ABSTRACT

A system, method and media for dynamically redacting data based on the evaluation of one or more policies. In one embodiment, the method comprises receiving a request to access one or more resources, receiving responses from the one or more resources and assembling a result set which includes several portions of data, determining current access policies for the requestor to the one or more resources, and redacting from the result set a portion of the data that the requestor is not permitted to receive, based on the current access policies.

18 Claims, 6 Drawing Sheets

U.S. PATENT DOCUMENTS

| | | |
|---|---|---|
| 6,466,932 B1 | 10/2002 | Dennis et al. |
| 6,484,261 B1 | 11/2002 | Wiegel |
| 6,510,513 B1 | 1/2003 | Danieli |
| 6,539,380 B1 | 3/2003 | Moran |
| 6,542,993 B1 | 4/2003 | Erfani |
| 6,578,037 B1 | 6/2003 | Wong et al. |
| 6,651,249 B2 | 11/2003 | Waldin et al. |
| 6,715,077 B1 | 3/2004 | Vasudevan et al. |
| 6,757,822 B1 | 6/2004 | Feiertag et al. |
| 6,772,332 B1 | 8/2004 | Boebert et al. |
| 6,792,537 B1 | 9/2004 | Liu et al. |
| 6,807,636 B2 | 10/2004 | Hartman et al. |
| 6,820,082 B1 | 11/2004 | Cook et al. |
| 6,832,313 B1 | 12/2004 | Parker |
| 6,854,035 B2 | 2/2005 | Dunham et al. |
| 6,873,988 B2 | 3/2005 | Herrmann et al. |
| 6,931,549 B1 | 8/2005 | Ananda |
| 6,941,471 B2 | 9/2005 | Lin |
| 6,970,445 B2 | 11/2005 | O'Neill et al. |
| 6,978,979 B2 | 12/2005 | Goh |
| 7,003,578 B2 | 2/2006 | Kanada et al. |
| 7,080,224 B2 | 7/2006 | Soejima et al. |
| 7,093,283 B1 | 8/2006 | Chen et al. |
| 7,181,513 B1 | 2/2007 | Harada et al. |
| 7,185,332 B1 | 2/2007 | Waldin et al. |
| 7,216,125 B2 | 5/2007 | Goodwin |
| 7,219,140 B2 | 5/2007 | Marl et al. |
| 7,234,168 B2 | 6/2007 | Gupta et al. |
| 7,272,625 B1 | 9/2007 | Hannel et al. |
| 7,293,080 B1 | 11/2007 | Clemm et al. |
| 7,296,292 B2 | 11/2007 | Chang et al. |
| 7,466,334 B1 | 12/2008 | Baba |
| 2001/0007133 A1 | 7/2001 | Moriconi et al. |
| 2001/0023421 A1 | 9/2001 | Numao et al. |
| 2002/0016777 A1 | 2/2002 | Seamons et al. |
| 2002/0091975 A1 | 7/2002 | Redlich et al. |
| 2002/0099699 A1 | 7/2002 | Kindo et al. |
| 2002/0138726 A1 | 9/2002 | Sames et al. |
| 2002/0166052 A1 | 11/2002 | Garg et al. |
| 2002/0169954 A1 | 11/2002 | Bandini et al. |
| 2002/0169975 A1 | 11/2002 | Good |
| 2002/0178119 A1 | 11/2002 | Griffin et al. |
| 2003/0014394 A1 | 1/2003 | Fujiwara et al. |
| 2003/0093581 A1 | 5/2003 | Oliver et al. |
| 2003/0110073 A1 | 6/2003 | Briel et al. |
| 2003/0115484 A1 | 6/2003 | Moriconi et al. |
| 2003/0126236 A1 | 7/2003 | Marl et al. |
| 2003/0126464 A1 | 7/2003 | McDaniel et al. |
| 2003/0131245 A1 | 7/2003 | Linderman |
| 2003/0154401 A1 | 8/2003 | Hartman et al. |
| 2003/0182577 A1 | 9/2003 | Mocek |
| 2003/0204719 A1 | 10/2003 | Ben-Itzhak |
| 2003/0212673 A1 | 11/2003 | Kadayam et al. |
| 2003/0229501 A1 | 12/2003 | Copeland et al. |
| 2003/0236977 A1 | 12/2003 | Levas et al. |
| 2004/0010719 A1 | 1/2004 | Daenen |
| 2004/0034767 A1 | 2/2004 | Robinson et al. |
| 2004/0034774 A1 | 2/2004 | Le Saint |
| 2004/0088313 A1 | 5/2004 | Torres |
| 2004/0098606 A1 | 5/2004 | Tan |
| 2004/0107360 A1 | 6/2004 | Herrmann et al. |
| 2004/0139043 A1 | 7/2004 | Lei et al. |
| 2004/0153451 A1 | 8/2004 | Phillips et al. |
| 2004/0162905 A1 | 8/2004 | Griffin et al. |
| 2004/0162906 A1 | 8/2004 | Griffin et al. |
| 2004/0215650 A1 | 10/2004 | Shaji et al. |
| 2004/0225893 A1 | 11/2004 | Ng |
| 2004/0236760 A1 | 11/2004 | Arkeketa et al. |
| 2004/0243644 A1 | 12/2004 | Steere et al. |
| 2004/0243824 A1 | 12/2004 | Jone |
| 2004/0243835 A1 | 12/2004 | Terzos et al. |
| 2004/0268148 A1 | 12/2004 | Karjala et al. |
| 2005/0027723 A1 | 2/2005 | Jones et al. |
| 2005/0182949 A1 | 8/2005 | Phillips et al. |
| 2005/0246338 A1 | 11/2005 | Bird |
| 2006/0155863 A1 | 7/2006 | Schmidt |
| 2006/0167858 A1 | 7/2006 | Dennis et al. |
| 2006/0179296 A1 | 8/2006 | Bartlett et al. |
| 2006/0200463 A1 | 9/2006 | Dettinger et al. |
| 2007/0245416 A1 | 10/2007 | Dickinson et al. |
| 2009/0187964 A1 | 7/2009 | Kao et al. |

OTHER PUBLICATIONS

International Search Report for PCT/US06/10451, dated Oct. 19, 2007, 8 pages.

Office Action dated Sep. 29, 2009 in connection with U.S. Appl. No. 11/222,287 filed Sep. 8, 2005 (22 pages).

Office Action dated Apr. 30, 2009 in connection with U.S. Appl. No. 11/222,280 filed Sep. 8, 2005 (21 pages).

Foldoc, Dictionary Definition: "API", dated Feb. 1995, retrieved from <http://foldoc.org/>.

Webopedia.com. Dictionary Definition: "API", retrieved Oct. 2008, retrieved from <http://www.webopedia.com/TERM/A/API.html>.

Issarny et al. "Software Architecture for Mobile Distributed Computing", Software Architecture, 2004, WICSA 2004, Proceedings, Fourth Working IEEE/IFIP Conference on Jun. 12-15, 2004, pp. 201-210.

Chun-Hsian et al. "UML Based Hardware/Software Co-Design Platform for Dynamically Partially Reconfigurable Network Security Systems", Computer Systems Architecture Conference, 2008, ACSAC 2008, 13th Asia-Pacific, Aug. 4-6, 2008, pp. 1-8.

Liu et al. "Active Security Support for Active Networks" Systems, Man, and Cybernetics, Part C: Applications and Reviews, IEEE Transactions on vol. 33, Issue 4, Nov. 2003 pp. 432-435.

Non-redacted Report

Employee Top Salaries 2005

|  | Staff | Engineer | Sales | Manager | Sr. Manager |
|---|---|---|---|---|---|
| Berkeley | $75k | $135k | $80k | $140k | $155k |
| Oakland | $56k | $93k | N/A | $122k | N/A |
| Petaluma | $66k | $75k | $95k | $95k | $112k |
| Santa Cruz | $55k | $80k | $130k | $90k | $120k |
| San Jose | $70k | $120 | $144k | $120k | $145k |
| San Francisco | $78k | $155k | $170k | $155k | $175k |

*Figure 1a*

Redacted Report

Employee Top Salaries 2005

|  | Staff | Engineer |
|---|---|---|
| Berkeley | $75k | $135k |
| Oakland | $56k | $93k |
| Petaluma | $66k | $75k |
| Santa Cruz | $55k | $80k |
| San Jose | $70k | $120k |
| San Francisco | $78k | $155k |

*Figure 1b*

```
═══════Instance Document═══════
<Employees>
    <Employee>
        <Name> Mike P. Smith </Name>
        <Department> Sales </Department>        } 200
        <Salary> $144,000.00 </Salary>
    </Employee>

<Employee>
        <Name> Susan White </Name>
        <Department> Engineer </Department>
        <Salary> $80,000.00 </Salary>
    </Employee>

</Employees>
```

*Figure 2a*

```
═══════Redacted Instance Document═══════
<Employees>
    <Employee>
        <Name> Mike P. Smith </Name>
        <Department> Sales </Department>        } 200

</Employee>

<Employee>
        <Name> Susan White </Name>
        <Department> Engineer </Department>
        <Salary> $80,000.00 </Salary>
    </Employee>
    ...
</Employees>
```

*Figure 2b*

SYSTEM AND METHOD FOR DYNAMIC DATA REDACTION

CLAIM OF PRIORITY

This application claims the benefit of U.S. Provisional Patent Application No. 60/679,823 entitled DYNAMIC DATA REDACTION, inventor Paul B. Patrick, filed May 11, 2005, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to dynamic data redaction, more particularly, data redaction based on dynamic evaluation of policies in a distributed computing environment.

RELATED APPLICATIONS

This application is related to the following applications:

U.S. patent application Ser. No. 10/961,595 entitled DISTRIBUTED ENTERPRISE SECURITY SYSTEM, by Paul Patrick et al., filed Oct. 8, 2004;

U.S. patent application Ser. No. 10/961,637 entitled DELAGATION IN A DISTRIBUTED SECURITY SYSTEM, by Paul Patrick et al., filed Oct. 8, 2004;

U.S. patent application Ser. No. 10/961,549 entitled DISTRIBUTED SECURITY SYSTEM WITH DYNAMIC ROLES, by Paul Patrick et al., filed Oct. 8, 2004;

U.S. patent application Ser. No. 10/961,351 entitled DISTRIBUTED SECURITY SYSTEM WITH SECURITY SERVICE PROVIDERS, by Paul Patrick et al., filed Oct. 8, 2004;

U.S. patent application Ser. No. 10/961,701 entitled AN EMBEDDABLE SECURITY SERVICE MODULE, by Paul Patrick et al., filed Oct. 8, 2004;

U.S. patent application Ser. No. 10/962,067 entitled CONFIGURATION OF A DISTRIBUTED SECURITY SYSTEM, by Paul Patrick et al., filed Oct. 8, 2004;

U.S. patent application Ser. No. 10/961,808 entitled POLICY ANALYSIS TOOL, by Paul Patrick et al., filed Oct. 8, 2004;

U.S. patent application Ser. No. 10/961,593 entitled DISTRIBUTED SECURITY SYSTEM POLICIES, by Paul Patrick et al., filed Oct. 8, 2004;

U.S. patent application Ser. No. 10/962,079 entitled POLICY INHERITENCE THROUGH NESTED GROUPS, by Paul Patrick et al., filed Oct. 8, 2004;

U.S. patent application Ser. No. 10/961,675 entitled SECURITY PROVIDER DEVELOPMENT MODEL, by Paul Patrick et al., filed Oct. 8, 2004;

U.S. patent application Ser. No. 10/961,674 entitled SECURITY CONTROL MODULE, by Paul Patrick et al., filed Oct. 8, 2004;

U.S. patent application Ser. No. 10/961,839 entitled DELEGATED ADMINISTRATION FOR A DISTRIBUTED SECURITY SYSTEM, by Paul Patrick et al., filed Oct. 8, 2004;

U.S. patent application Ser. No. 10/961,850 entitled DYNAMICALLY CONFIGURABLE DISTRIBUTED SECURITY SYSTEM, by Paul Patrick et al., filed Oct. 8, 2004;

U.S. patent application Ser. No. 10/961,544 entitled DYNAMICALLY CONFIGURABLE DISTRIBUTED SECURITY SYSTEM, by Paul Patrick et al., filed Oct. 8, 2004;

U.S. patent application Ser. No. 10/962,106 entitled DISTRIBUTED ENTERPRISE SECURITY SYSTEM, by Paul Patrick et al., filed Oct. 8, 2004;

U.S. patent application Ser. No. 10/961,677 entitled DISTRIBUTED ENTERPRISE SECURITY SYSTEM FOR A RESOURCE HIERARCHY, by Paul Patrick et al., filed Oct. 8, 2004;

U.S. Patent Application Ser. No. 60/665,696 entitled SECURITY DATA REDACTION, by Paul Patrick, filed Mar. 28, 2005;

U.S. Patent Application Ser. No. 60/679,823 entitled DYNAMIC DATA REDACTION, by Paul Patrick, filed May 11, 2005;

U.S. Patent Application No. 60/679,823 entitled SECURITY DATA REDACTION, by Paul Patrick, filed Mar. 28, 2005;

U.S. patent application Ser. No. 11/222,280, entitled DATA REDACTION CLIENT, by Paul Patrick, filed Sep. 8, 2005; and, U.S. patent application Ser. No. 11/222,287, entitled DYNAMIC DATA REDACTION, by Paul Patrick, filed Sep. 8, 2005.

BACKGROUND

Many enterprises have security issues which are centered around control of access to data on a finer grain than an entire electronic document. Some systems attempt to satisfy this requirement with label-based security within a database. The data is labeled in the database and security enforcement based on the labels is performed in the database itself. However, this approach does not address securing information from sources that are accessed via web services or other integration mechanisms. There also lacks a means to bring data together from disparate sources, each of which might be accessible from someone with a given authorization level but when brought together might require a different authorization level. What is needed is a security system which can address these inadequacies.

BRIEF DESCRIPTION OF THE DRAWINGS

FIG. 1a is a graphical user interface presentation of a company report.

FIG. 1b illustrates a redacted version of the report in FIG. 1a.

FIG. 2a is a partial illustration of an XML document which can back the chart of FIG. 1a in accordance to an embodiment.

FIG. 2b is a partial illustration of a redacted version of the document of FIG. 2a in accordance to an embodiment.

DETAILED DESCRIPTION

Figure 3:
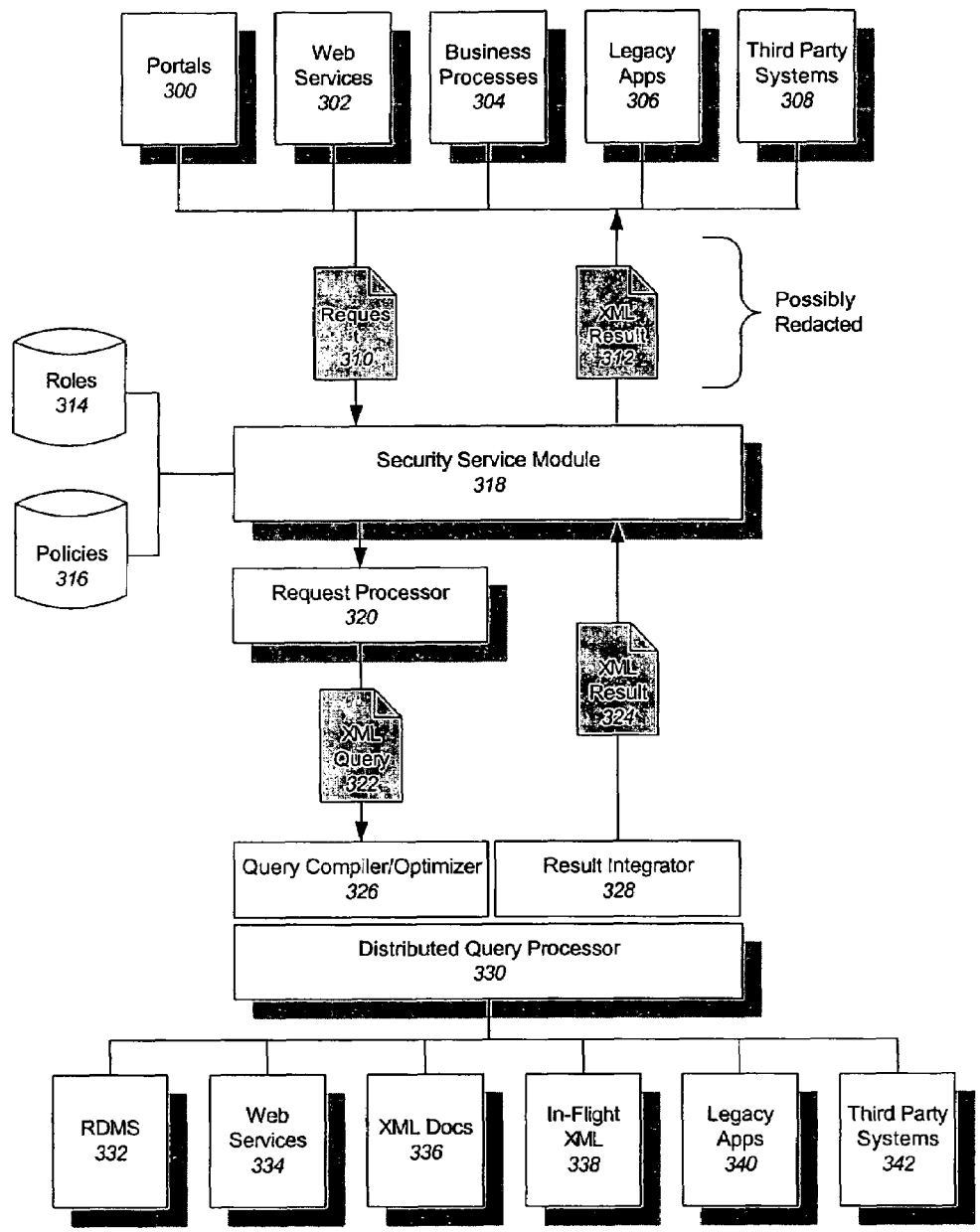
FIG. 3 is an illustration of a system for dynamically redacting data in accordance to an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Although a diagram depicts components as logically separate, such depiction is merely for illustrative purposes. It will be apparent to those skilled in the art that some or all of the components portrayed can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

Many organizations, including companies in regulated industries such as healthcare and financial services, have very strict rules governing access to information. When information is provided to a requesting user or process, there may arise the need to censor some or all of the information depending on the access privileges of the requestor. This is especially true if the information is culled from different sources. By way of illustration, FIG. 1a is a graphical user interface presentation of a company report of top employee salaries by title and office location. Companies ordinarily keep such information confidential with exceptions made for management and accounting personnel. Rather than provide all of the information in FIG. 1a, a company would desire to remove or obscure information from the report dynamically as determined by evaluation of policies that take into account the information desired, the requestor's role in the company, and/or other factors.

By way of further illustration, FIG. 1b illustrates a redacted version of the report in FIG. 1a. Notice that the Sales, Manager and Sr. Manager columns have been dropped. This might be the desired result if the requestor was a manager who was only authorized to view salaries for positions of lower rank. Alternatively, requester may have been authorized to view all employees' salaries but lacked authorization to view management salaries and non-management salaries in the same report. It should be noted that the information underlying FIGS. 1a and 1b can be culled from more than one source.

FIG. 2a is a partial illustration of an extensible Markup Language (XML) document which can back the chart of FIG. 1a. XML is a markup language which can be used to label the information content of varied data sources. Although examples are given in terms of XML, those of skill in the art will recognize that the teachings herein are applicable to data/information representations of any kind, not merely those illustrated. Furthermore, it should be noted that the information illustrated in the document could be obtained from more than one data source. Employee element 200 corresponds to the San Jose office's top sales salary 100 in the chart of FIG. 1a. If, as above, the requestor lacked authorization to view this element, the salary information for Mike Smith could be redacted (as shown in FIG. 2b) prior to providing the data to the requestor. If the data is represented as an XML document, portions of the XML document can be redacted using XML Query ("XQuery") and/or XML Path Language ("XPath"), the specifications of which are available from the World Wide Web Consortium ("W3C").

Before delving into more particulars, a discussion of resources, policies and roles is in order. In one embodiment, a resource represents a component of an application, information, a process, a service, a function, an object, a device and/or any other suitable data and/or entity which can be interacted with programmatically and/or via a communications protocol. In aspects of these embodiments, a resource can be an XML document or a portion thereof. A resource attribute is a property and/or an operation associated with the resource. For example, a filetype resource attribute could indicate whether a file resource has a corresponding HTML, image, JSP or PDF representation. The file resource could also support read, write and delete operational attributes for manipulating its content. The present disclosure is not limited to or dependent on any type of resource or resource attribute. Other resources and resource attributes, known or yet to be developed, are possible and fully within the scope and spirit of the present disclosure.

Access to resources and/or resource attributes can be controlled by policies. Policies can be analogized to declarative rules, such as:

Only employees in the sales team may view sales documents.

Or

Only managers can view engineer salaries.

In one embodiment, polices can be based on roles. Roles specify a dynamic association of users and/or groups of users based on some criteria. For example, a system administrator role might include users having a certain skill level and only during certain times of day (e.g., after 5:00 pm). In one embodiment, roles can be defined by policies.

Generally speaking, a policy can be expressed as follows (wherein items in italic font are optional):

[GRANT, DENY] (action/role, resource, subject) IF (constraint condition)$_1$ . . . IF (constraint condition)$_N$ Where:

GRANT permits a specified action; DENY denies it.

Action is the name of a target resource or a resource attribute to grant or deny access to. Alternatively, role is the name of a role to grant or deny membership to.

Resource identifies the resource that this policy will be associated with. In aspects of these embodiments, resources can be organized in a hierarchy. The hierarchical children of a given resource in the hierarchy inherit the authorization policies associated with their parent resource(s). In one embodiment, policies assigned to individual resources take precedence over inherited policies. By way of illustration, assume resource C is a child of resource B, and resource B is a child of resource A. If policy P1 is associated with A, B and C will inherit P1. If policy P2 is associated with B (which is for the same control of access as P1), B and C will not inherit P1, but C will inherit P2. Finally, if C is associated with a policy P3 (which is for the same control of access as P2), then C will not inherit P2. If P1, P2 and P3 were all for different rules for controlling access, then B would inherit P1 and C would inherit P1 and P2.

Subject identifies one or more users, groups and/or roles that are granted/denied access/membership to the resource/role. A special wildcard subject called "any" denotes that any user, group and role is potentially a subject.

IF (constraint condition) is one or more optional conditions placed on the action. Conditions can include one or more arithmetic and logical functions and expressions involving attributes of resources or other entities in the system, such as user attributes, group membership, dynamic attributes (e.g., time, date, location), delegation attributes and other suitable information. In various embodiments, role and authorization policies can also be based on contextual data available at run-time (e.g., a transaction amount passed in as a parameter). In some cases, a constraint can utilize information that is not locally available and which could require retrieving it from another source or compute it from another piece of data.

By way of illustration, the following policy grants the ability to open accounts via the resource TellerApp to all users and groups belonging to a Tellers group from 9:00 AM to 5:00 PM, Monday through Friday:

GRANT (OpenAccount, TellerApp, Tellers) if time24 in [900 . . . 1700] AND if dayofweek in [Monday . . . Friday]

In one embodiment and by way of illustration, a determination of what policies apply for an action at a given point in time depends on the role(s) the requestor belongs to at that point in time. For example, applicable policies would be polices associated with the target resource/resource attribute and its parents in a resource hierarchy wherein the requestor's roles satisfied each policy's subject. Applicable polices are then evaluated to determine if any would grant the action.

FIG. 3 is an illustration of a system for dynamically redacting data in accordance to an embodiment. Various client requesters 300-308 can interact with the system by generating a request 310 to access one or more resources 332-342. Requestors can include web portals 300, web services 302, business processes 304, legacy applications 306, third party systems 308, and/or any program/device capable of generating a request. In one embodiment, resources can include relational database management systems 332, web services 334, XML documents 336, in-flight XML 338, legacy applications 340, third party systems 342, and/or any program/device capable of responding to a request. In one embodiment, the request is processed by a gatekeeper called a Security Service Module (SSM) 318 before reaching a resource. In various embodiments, an SSM can be integrated with a server, application server, web server, a process or any other suitable host such as network firewalls, routers, relays, etc. In aspects of these embodiments, a container (e.g., an Enterprise Java® Bean or servlet container) can intercept the request and present it to the SSM. By way of illustration, the SSM can be provided with a request context that includes subject that holds an authenticated identity (e.g., an authenticated user), a resource identifier, user/group information, and/or an object through which the SSM can obtain additional information about the context of the request.

In one embodiment, the SSM determines what roles (if any) the identity of the requestor belongs to based on predefined roles 314. This is called role mapping. Role mapping can occur just prior to when an access decision is rendered for a resource. The SMM also determines what policies 316 (if any) apply to the request based on the mapped roles, the target resource and requested action. Access to the resource is granted or denied based on evaluation of the applicable polices.

In one embodiment, if access to the target resource is granted, the request is provided to request processor 320 which can convert the request into an XML Query ("XQuery") 322 or other suitable form. XQuery is a query language for XML that uses the structure of XML to express queries involving varied types of data either physically stored in an XML document or viewed as such. In other embodiments, the request can take the form of a Structured Query Language (SQL) expression or any other means for identifying sought after information. It will be appreciated by those of skill in the art that the present disclosure is not limited to or dependent upon the format of the request.

In one embodiment, the XQuery can then be provided to a query compiler/optimizer 326 which parses the query and determines whether the query can be rewritten in order to improve performance of servicing the query based upon one or more of execution time, resource use, efficiency or other performance criteria. A query plan can be generated and provided to distributed query processor 330 which propagates queries to one or more services (332-342) based on the query plan. Result(s) from the service(s) are assembled and transformed in the result integrator 328 into a result format 324 (e.g., an XML document or other data format) usable by the requester. In one embodiment, BEA Liquid Data for WebLogic®, available from BEA Systems, Inc., can be used to provide the functionality of components 320, 326, 328 and 330.

In one embodiment, the result 324 is intercepted by the SSM before it reaches the requestor in order to determine if any data in the result should be redacted. In aspects of this embodiment, the SSM evaluates one or more polices directed to specific parts of the result 324. Only the parts to which the requester is granted access are returned in the final result 312. Alternatively, the parts to which the requestor is not granted access can be encrypted in the final result 312. In a further embodiment, polices can be used to deny access to specific combinations of data in the result 324. This embodiment allows data to be aggregated from disparate sources (332-342), each of which the requestor might be authorized to access, but when brought together might exceed the requestor's authorization.

Figure 4:
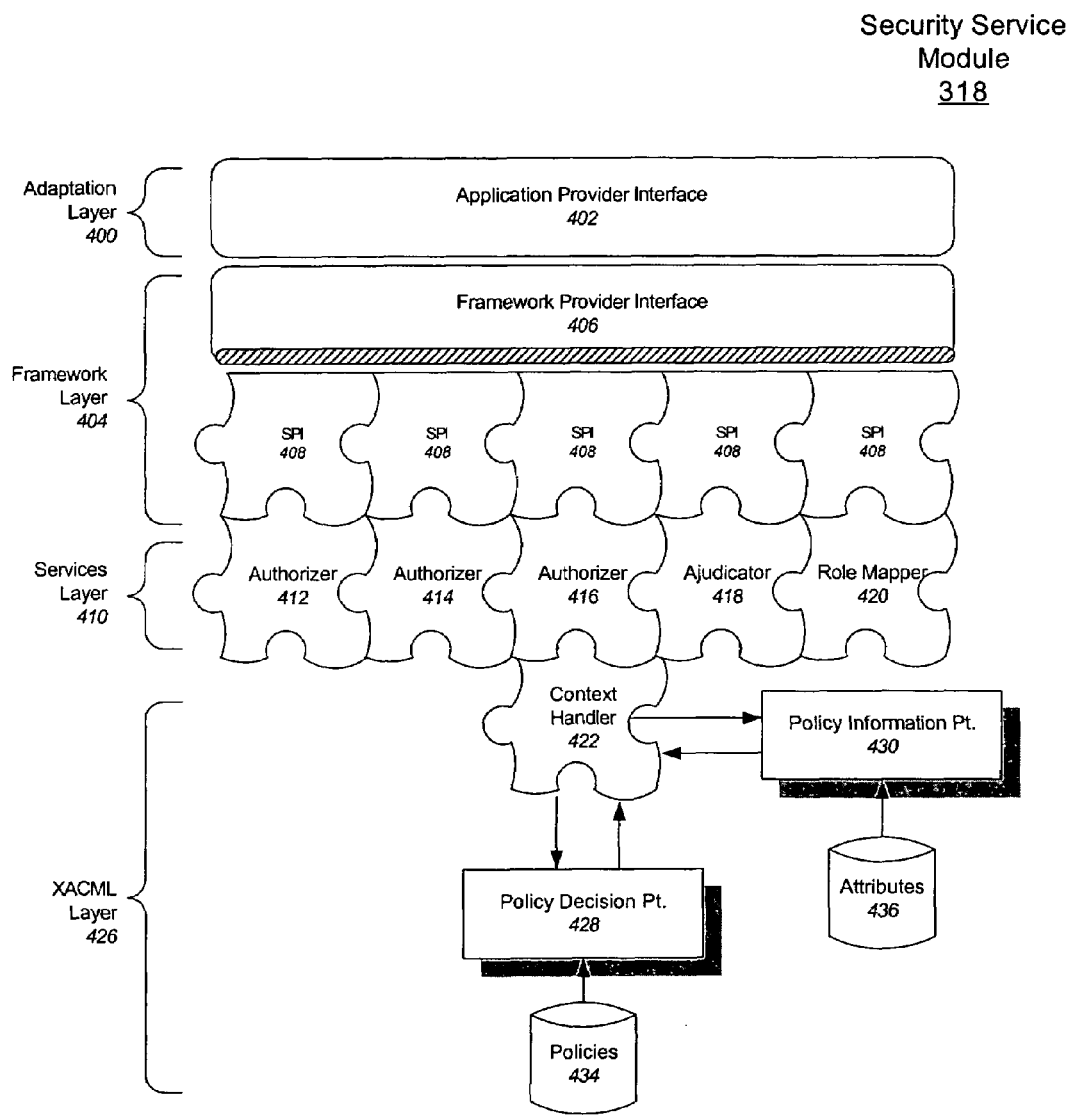
FIG. 4 is an illustration of an SSM in accordance to an embodiment.

FIG. 4 is an illustration of an SSM in an embodiment. In aspects of these embodiments, the SSM includes several functional layers that can reside in one or more processes. An adaptation layer 400 ties a framework layer 404 and a services layer 410 to a run-time environment. The adaptation layer includes an Application Program Interface (API) 402 to allow exploitation of the framework layer in the run-time environment. In aspects of these embodiments, an API can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any API implementation presently known or yet to be developed, as will be appreciated by those of skill in the art.

The adaptation layer can invoke services of the framework layer via a framework programming interface (FPI) 406. In one embodiment, the adaptation layer invokes the FPI to process inbound requests 310 and outbound results 324, which in turn affords each service provider module 412-420 in the services layer the opportunity to process the request/result. The framework layer can invoke services of the services layer via a service provider interface (SPI) 408. As with the adaptation layer API, the FPI and SPI can comprise a programmatic interface (e.g., class, method and/or function definitions), a communication interface such as a web service or other suitable mechanism for exchanging messages, and/or any other suitable protocol for invoking functionality and exchanging information. The present disclosure is not limited to or dependent on any FPI/SPI implementation presently known or yet to be developed, as will be appreciated by those of skill in the art.

In aspects of these embodiments, the FPI can translate API invocations into one or more SPI invocations. The FPI also hides the SPI from the adaptation layer, thus preventing any dependency on the SPI from forming. The SPI provides the FPI access to a set of dynamically configurable security services represented as "plug in" security provider modules ("providers") 412-420. Each provider is compatible with the SPI (e.g., each provider implements the SPI). The services layer can accommodate more than one provider of the same type. In another embodiment, the adaptation layer can communicate directly with the services layer, without an intervening framework layer (e.g., the API could invoke the SPI directly).

In one embodiment and by way of illustration, role mapping provider(s) 420 dynamically determine applicable roles based on role definitions 314 before authorization provider(s) 412-416 are invoked to individually render a decision regarding whether or not a requestor is authorized to submit the request or receive the response. In aspects of this embodiment, an authorization provider can evaluate policies 316 based on mapped roles to determine whether or not access to a resource should be granted. In yet another embodiment, the determination of each authorization provider is used to render a final grant or deny decision by the adjudicator provider 418. For example, the adjudicator may grant access to a resource only if all authorization providers would grant access. Other provider types are possible (not shown): authentication provider(s) can authenticate, verify, and map security tokens to an internal format and support, for example, a single sign-on capability; audit provider(s) can audit some or all security actions taken by the framework layer; and credential mapping provider(s) can map authentication credentials for a user to legacy application for single sign-on.

In one embodiment, the response 324 can have an authorization check performed against its contents prior to returning it to the requestor (as response 312). In aspects of this embodiment, the eXtensible Access Control Markup Language (XACML), indicated as XACML Layer 426 in FIG. 4, provides a general-purpose language for representing and evaluating access control policies in this regard. The XACML standard is maintained by the Organization for the Advancement of Structured Information Standards (OASIS), a global consortium. (An implementation of XACML for the Java® programming language is available from Sun Microsystems, Inc.) XACML supports the use of XPath expressions for addressing locations within structured data, such as an XML document, allowing the document to have policies written against its contents.

In one embodiment, an authorization provider 416 can act as a XACML Policy Enforcement Point (PEP). The PEP communicates with an XACML context handler 422 which has access to the result 324. In order to enforce policy, the context handler can formalize attributes 436 describing the requester at Policy Information Point (PIP) 430 and delegate the authorization decision to a Policy Decision Point (PDP) 428. Applicable policies are located in a policy store 434 and are evaluated at the PDP, which then returns an access decision to the context handler. In one embodiment, policies 316 can be automatically translated to XACML policies 434, and vice versa. In another embodiment, all policies in the system are represented as XACML policies and wherein an authorization provider can elect to use the policies and further elect to translate the policies to a form suitable for evaluation.

An XACML policy comprises a set of rules, an optional set of obligations, and the identity of a rule-combining algorithm to adjudicate results from more than one policy to yield a single result. Obligations for rules evaluated by the PDP are provided by the PDP to the PEP for enforcement upon a grant or deny authorization decision by the PDP. An obligation can be used to trigger any kind of action in the PEP, including in one embodiment removing data from (or encrypting data in) the result 324 which the requestor is not authorized to see or access. The modified result 312 can then be safely provided to the requester.

By way of illustration and with reference to FIG. 2a, an XPath expression such as "/employees/employee [department==Sales]>" would select all employees in the instance document that are in the sales department. This expression could be used be part of an XACML policy rule having an obligation action to redact the salary information from the result 324 or encrypt it such that the requestor cannot access it. By way of further illustration, an XACML rules can access data from more than portion of the result 324 allowing for policies to make correlations between potentially different data sources.

Figure 5:
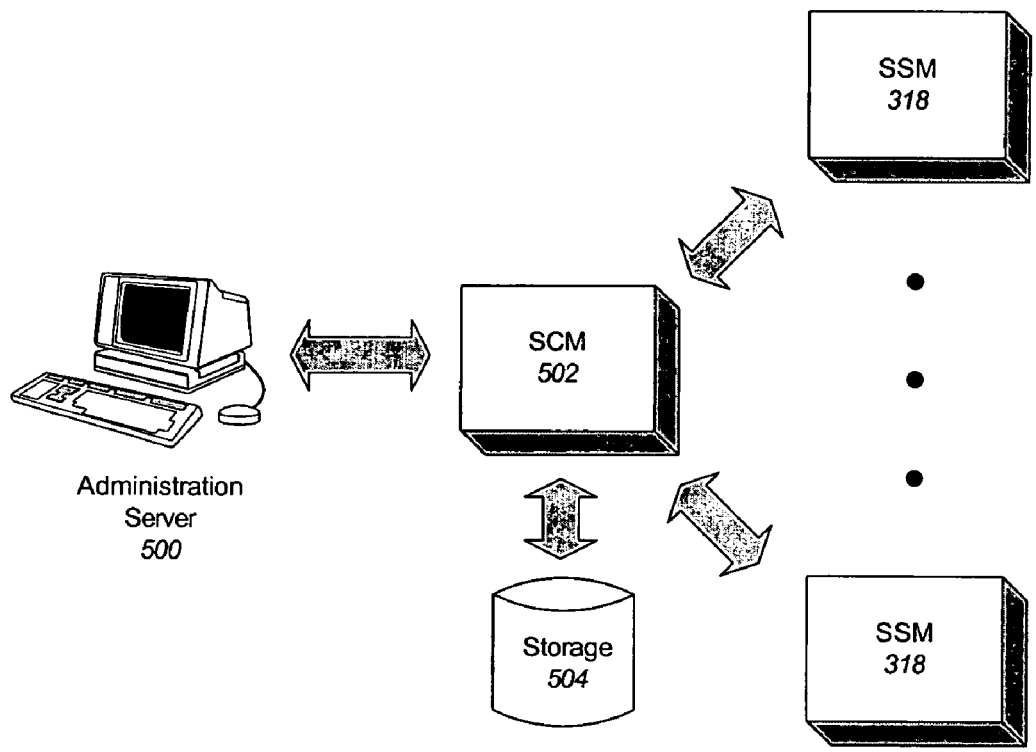
FIG. 5 is an illustration of system components to propagate security information in accordance to an embodiment.

In one embodiment, SSMs are part of a distributed security network. FIG. 5 is an illustration of system components to propagate security information in accordance to an embodiment. In one embodiment, policy and/or SSM configuration information (hereinafter "security information") is distributed to SSMs via Security Control Mangers (SCMs) 502. This is referred to as "provisioning". SCMs can reside anywhere on a computer network. In one embodiment, an SCM resides locally on systems that have one or more SSMs. An administration server 500 can provision the security information to an SCM periodically. In one embodiment, the information provisioned to an SCM is only relevant to SSMs deployed on the same system as the SCM. In aspects of these embodiments, only changes ("deltas") to this information are propagated to SCMs. This is desirable since it can reduce the amount of information that needs to be transmitted between the administration server and the SCMs. By way of illustration, this can be accomplished by associating a version number with provisioning information or subsets thereof.

SCMs can cache provisioned information in a local store 504 and further provision it to one or more SSMs. In one embodiment, an SCM provisions information to SSMs that reside on the same system as the SCM. In various embodiments, provisioned information can specify security providers, locations of directory servers, databases, XACML configuration information, and other suitable information. By way of illustration, an SSM can dynamically incorporate security providers based on configuration information supplied to it by an SCM.

The SCM has many architectural benefits for the system. Firstly, the SCM can serve as the sole external management interface for all SSM components. This can eliminate redundant management infrastructure in system components, thus allowing all system components to take advantage of improvements in future versions of the SCM management interface. Secondly, having a single management interface per computing device has security benefits. An SCM-enabled host can expose a single management communication channel rather than one per SSM. This eliminates the need for a listen port in each SSM process, drastically reducing the number of open ports that are required to be secured and monitored. Finally, the use of the SCM can greatly simplify SSM configuration. Rather than relying on instance specific configuration files, an SSM can retrieve its entire configuration from the SCM via a well-known communication port.

In one embodiment, an SCM can supply provisioned information to SSMs as needed (e.g., in response to requests by SSMs). In another embodiment, the SCM can also convey the information automatically without being requested to do so. In aspects of these embodiments, an SCM only provides provisioning information to an SSM is that relevant to that SSM and, in further aspects, only provides deltas to SSMs. In various embodiments, communication between system components can be accomplished with secure protocols. By way of illustration, mutually authenticated Transport Layer Security (TSL) connections can be utilized between components. In addition, the SCM and SSM can exchange Public-Key Infrastructure (X.509) certificates to establish identity and trust.

To facilitate the management of a potentially large number of distributed SSMs, the administration server uses a remote administration mechanism to distribute security information to each SSM. In various embodiments, the SCM is a component of this remote administration mechanism. Each SCM is responsible for storing 404 and maintaining policy and configuration information for all SSMs that it are associated with. In one embodiment, an SCM is associated with the SSMs on its local machine. When a change to an SSM's configuration or policy is made and distributed from an administration console, an SCM receives the change and updates its cached copy of the configuration. The change is then propagated to the SSM which can adapt to the configuration change dynamically or at a later time. In addition to facilitating management, the SCM enables SSMs to operate in the absence of the administration server. Since SCMs maintain a persistent copy of each configuration, new SSMs can be started and existing SSMs can continue to function, even if the Administration server goes down.

In one embodiment, the administration console can provide a graphical user interface for defining policies. For example, the user interface could provide a rendering of the XML document 324 that would allow a user to interactively select elements of the document and define the policy required to access those elements. In a further embodiment, a graphical editor or wizard that would present the user with easy-to-follow steps for defining a policy, such that the user would not require any knowledge of the underlying policy mechanism.

Although this embodiment was described with reference to a graphical user interface, a user interface is not limited to such and can include one or more of the following: an ability to respond to sounds and/or voice commands; an ability to respond to input from a remote control device (e.g., a cellular telephone, a PDA, or other suitable remote control); an ability to respond to gestures (e.g., facial and otherwise); an ability to respond to commands from a process on the same or another computing device; and an ability to respond to input from a computer mouse and/or keyboard. This disclosure is not limited to any particular user interface. Those of skill in the art will recognize that many other user interfaces presently known and yet to be developed are possible and fully within the scope and spirit of this disclosure.

Figure 6:
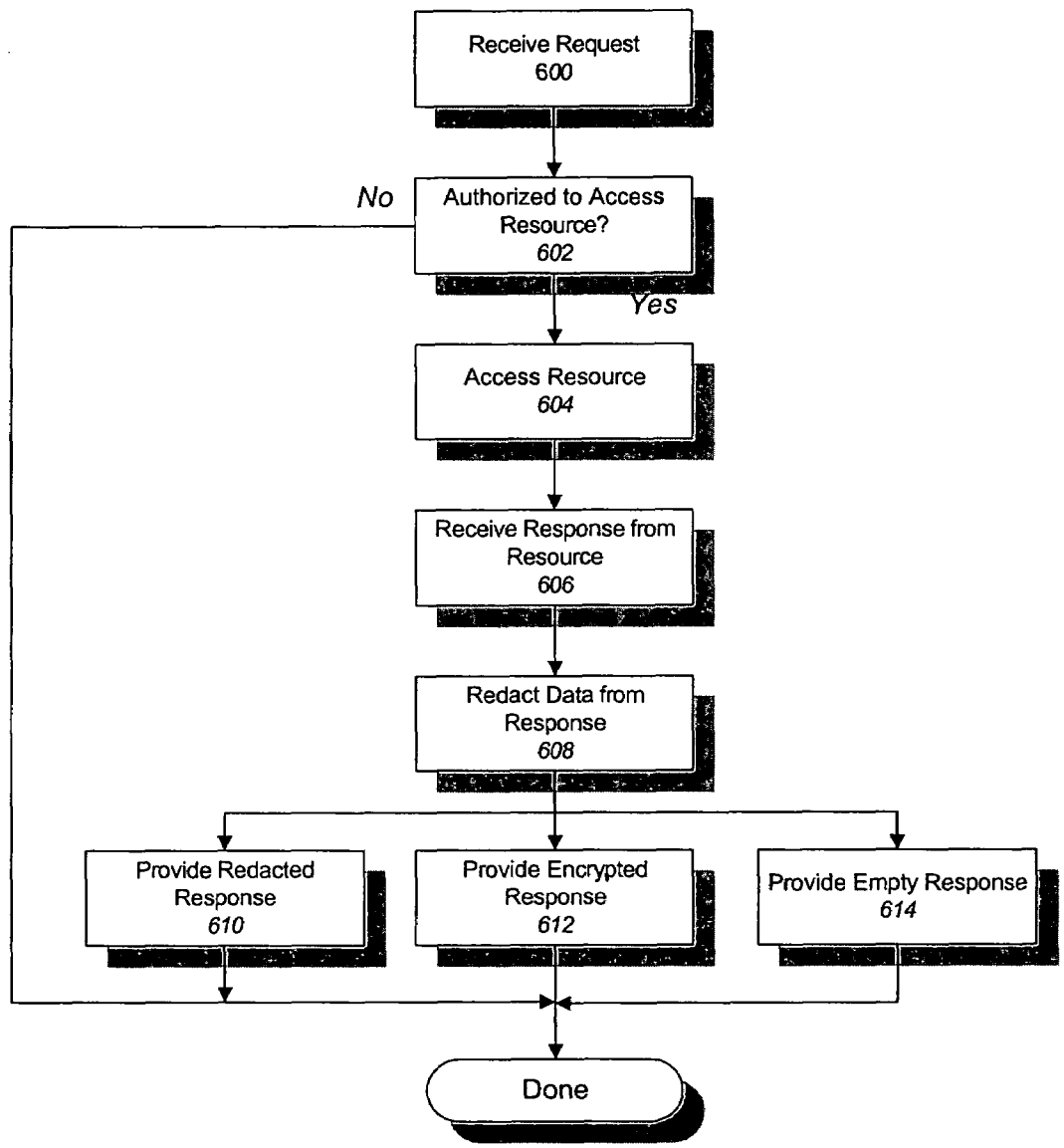
FIG. 6 is an flow diagram illustrating dynamic data redaction in an embodiment.

FIG. 6 is an flow diagram illustrating dynamic data redaction in an embodiment. Although this figure depicts processing in a particular order for purposes of illustration, one skilled in the art will appreciate that various processes portrayed in this figure can be omitted, rearranged, performed in parallel, combined and/or adapted in various ways. In block 600 a request to access one or more resources is received from a requestor. At block 602 it is determined whether the requestor is authorized to access the one or more resources. If not, access is not granted. Otherwise, the resource(s) are accessed at block 604 and a response from the resource(s) is received at block 606. Data to which the requestor is not authorized to view is redacted at block 608 and is either redacted from the response (block 610) or encrypted in the response (block 612). Alternatively, no response or an empty response is provided to the requester (block 614).

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer-implemented method for securing access to data, comprising:
   providing a computer including a processor, storage medium, and security service module operating thereon;
   receiving, at the security service module, a request from a requestor to access one or more resources;
   accessing the one or more resources on behalf of the requestor;
   receiving, at the security service module, responses from the one or more resources, and aggregating a result set wherein the aggregated result set includes several portions of disparate resource data;
   determining current access policies for the requestor corresponding to each of said several portions of disparate resource data;
   redacting from the aggregated result set a portion of said disparate resource data that the requestor is not permitted to receive, based on said current access policies, to create a redacted result set from said aggregated result set when said aggregated result set exceeds the requestor's authorization while each of said disparate resources the requestor is authorized to access; and
   providing the redacted result set to the requestor.

2. The method of claim 1 wherein the redacting further comprises:
   after receiving, at the security service module, the responses from the one or more resources, and assembling then result set then deleting the portion of the data from the result set that the requestor is not permitted to receive, prior to providing the redacted result set to the requestor.

3. The method of claim 1 wherein the redacting further comprises:
   after receiving, at the security service module, the responses from the one or more resources, and assembling then result set then encrypting the portion of the data in the result set that the requestor is not permitted to receive, prior to providing the redacted result set and the encrypted portion to the requestor.

4. The method of claim 1 wherein the redacting further comprises:
   evaluating at least one policy to determine if the requestor is permitted to receive the portion of the data, including determining which roles, if any, the requestor belongs, and determining which policies, if any, apply to the current request based on mapped roles, target resource and requested action.

5. The method of claim 1 wherein:
   the result set is an XML document, and wherein, the portions of data to be redacted from the XML document are redacted by the security service module using one or more XML Query and/or XML Path Language commands.

6. The method of claim 1, wherein the one or more resources is a plurality of resources, and wherein the method includes
   receiving a request from a requestor to access the plurality of resources;
   assembling the result set based on aggregated responses from the plurality of resources;
   determining current access policies for the requestor to combinations of information in the result set based on the aggregated responses;
   using the current access policies to determine which, if any, portions of data to be redacted to create the redacted result set.

7. A machine readable storage medium having instructions embedded thereon and performing the following functions when executed by a processor:
   receive, at a security service module, a request from a requester to access one or more resources;
   access the one or more resources on behalf of the requester;
   receive, at the security service module, responses from the one or more resources, and aggregating a result set wherein the aggregated result set includes several portions of disparate resource data;
   determine current access policies for the requester corresponding to each of said several portions of disparate resource data;
   redact from the aggregated result set a portion of said disparate resource data that the requester is not permitted to receive, based on the current access policies, to create a redacted result set from said aggregated result set when said aggregated result set exceeds the requestor's authorization while each of said disparate resources the requestor is authorized to access; and
   provide the redacted result set to the requester.

8. The machine readable storage medium of claim 7, further comprising instructions that when used cause the system to:
   after receiving, at the security service module, the responses from the one or more resources, and assembling then result set then delete the portion of the data from the result set that the requestor is not permitted to receive, prior to providing the redacted result set to the requestor.

9. The machine readable storage medium of claim 7, further comprising instructions that when used cause the system to:
   after receiving, at the security service module, the responses from the one or more resources, and assembling then result set then encrypt the portion of the data in the result set that the requestor is not permitted to receive, prior to providing the redacted result set and the encrypted portion to the requestor.

10. The machine readable storage medium of claim 7, further comprising instructions that when used cause the system to:
    evaluate at least one policy to determine if the requestor is permitted to receive the portion of the data, including determining which roles, if any, the requestor belongs, and determining which policies, if any, apply to the current request based on mapped roles, target resource and requested action.

11. The machine readable storage medium of claim 7 wherein: the result set is an XML document, and wherein, the portions of data to be redacted from the XML document are redacted by the security service module using one or more XML Query and/or XML Path Language commands.

12. The machine readable storage medium of claim 7, further comprising instructions that when used cause the system to
    receive a request to access a plurality of resources;
    assemble the result set based on aggregated responses from the plurality of resources;
    determine current access policies for the requestor to combinations of information in the result set based on the aggregated responses;
    use the current access policies to determine which, if any, portions of data to be redacted to create the redacted result set.

13. A system for securing access to data, said system comprising:
- a computer including a processor, storage medium, and security service module operating thereon, wherein the security service module is configured to perform steps comprising;
- receiving, at the security service module, a request from a requestor to access one or more resources;
- accessing the one or more resources on behalf of the requester;
- receiving, at the security service module, responses from the one or more resources, and aggregating a result set wherein the aggregated result set includes several portions of disparate resource data;
- determining current access policies for the requester corresponding to each of said several portions of disparate resource data;
- redacting from the aggregated result set a portion of said disparate resource data that the requester is not permitted to receive, based on the current access policies, to create a redacted result set from said aggregated result set when said aggregated result set exceeds the requestor's authorization while each of said disparate resources the requestor is authorized to access; and
- providing the redacted result set to the requestor.

14. The system of claim 13 wherein the redacting further comprises:
- after receiving, at the security service module, the responses from the one or more resources, and assembling then result set then deleting the portion of the data from the result set that the requestor is not permitted to receive, prior to providing the redacted result set to the requestor.

15. The system of claim 13 wherein the redacting further comprises:
- after receiving, at the security service module, the responses from the one or more resources, and assembling then result set then encrypting the portion of the data in the result set that the requestor is not permitted to receive, prior to providing the redacted result set and the encrypted portion to the requestor.

16. The system of claim 13 wherein the redacting further comprises:
- evaluating at least one policy to determine if the requestor is permitted to receive the portion of the data, including determining which roles, if any, the requestor belongs, and determining which policies, if any, apply to the current request based on mapped roles, target resource and requested action.

17. The system of claim 13 wherein:
- the result set is an XML document, and wherein, the portions of data to be redacted from the XML document are redacted by the security service module using one or more XML Query and/or XML Path Language commands.

18. The system for securing access to data of claim 13, wherein the security service module is configured to perform steps comprising
- receiving a request from a requestor to access a plurality of resources;
- assembling the result set based on aggregated responses from the plurality of resources;
- determining current access policies for the requestor to combinations of information in the result set based on the aggregated responses;
- using the current access policies to determine which, if any, portions of data to be redacted to create the redacted result set.

* * * * *

UNITED STATES PATENT AND TRADEMARK OFFICE
CERTIFICATE OF CORRECTION

| | |
|---|---|
| PATENT NO. | : 7,748,027 B2 |
| APPLICATION NO. | : 11/222071 |
| DATED | : June 29, 2010 |
| INVENTOR(S) | : Paul B. Patrick |

It is certified that error appears in the above-identified patent and that said Letters Patent is hereby corrected as shown below:

In column 1, line 36, delete "DELAGATION" and insert -- DELEGATION --, therefor.

In column 1, line 59, delete "INHERITENCE" and insert -- INHERITANCE --, therefor.

In column 3, line 57, delete "requester" and insert -- requestor --, therefor.

In column 3, line 62, delete "extensible" and insert -- eXtensible --, therefor.

In column 5, line 39, delete "requesters" and insert -- requestors --, therefor.

In column 5, line 55, delete "serviet" and insert -- servlet --, therefor.

In column 5, line 66, delete "SMM" and insert -- SSM --, therefor.

In column 6, line 27, delete "requester." and insert -- requestor. --, therefor.

In column 6, line 36, delete "requester" and insert -- requestor --, therefor.

In column 7, line 64, delete "requester" and insert -- requestor --, therefor.

In column 8, line 17, delete "requester." and insert -- requestor. --, therefor.

In column 10, line 12, delete "requester" and insert -- requestor --, therefor.

In column 12, line 5, in claim 7, delete "requester" and insert -- requestor --, therefor.

In column 12, line 6, in claim 7, delete "requester;" and insert -- requestor; --, therefor.

In column 12, line 11, in claim 7, delete "requester" and insert -- requestor --, therefor.

In column 12, line 15, in claim 7, delete "requester" and insert -- requestor --, therefor.

In column 12, line 21, in claim 7, delete "requester." and insert -- requestor. --, therefor.

Signed and Sealed this
Nineteenth Day of April, 2011

David J. Kappos
*Director of the United States Patent and Trademark Office*

In column 12, line 58, in claim 12, delete "request to access" and
insert -- request from a requestor to access --, therefor.

In column 13, line 6, in claim 13, delete "comprising;" and insert -- comprising: --, therefor.

In column 13, line 8, in claim 13, delete "requester" and insert -- requestor --, therefor.

In column 13, line 10, in claim 13, delete "requester;" and insert -- requestor; --, therefor.

In column 13, line 15, in claim 13, delete "requester" and insert -- requestor --, therefor.

In column 13, line 19, in claim 13, delete "requester" and insert -- requestor --, therefor.

In column 13, line 25, in claim 13, delete "requester." and insert -- requestor. --, therefor.